US010264532B2

(12) United States Patent
Shen et al.

(10) Patent No.: US 10,264,532 B2
(45) Date of Patent: Apr. 16, 2019

(54) METHOD FOR CONTROLLING UPLINK POWER, ENODEB, AND USER EQUIPMENT

(71) Applicant: SHARP KABUSHIKI KAISHA, Osaka-shi, Osaka (JP)

(72) Inventors: Xingya Shen, Shanghai (CN); Renmao Liu, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/910,227

(22) PCT Filed: Aug. 7, 2014

(86) PCT No.: PCT/CN2014/083844
§ 371 (c)(1),
(2) Date: Feb. 4, 2016

(87) PCT Pub. No.: WO2015/018348
PCT Pub. Date: Feb. 12, 2015

(65) Prior Publication Data
US 2016/0174160 A1    Jun. 16, 2016

(30) Foreign Application Priority Data

Aug. 7, 2013 (CN) .......................... 2013 1 0341595

(51) Int. Cl.
*H04W 52/14* (2009.01)
*H04W 52/22* (2009.01)
(Continued)

(52) U.S. Cl.
CPC ......... *H04W 52/146* (2013.01); *H04W 52/22* (2013.01); *H04W 52/34* (2013.01);
(Continued)

(58) Field of Classification Search
CPC .... H04W 52/18; H04W 52/46; H04W 52/146
(Continued)

(56) References Cited

U.S. PATENT DOCUMENTS

2010/0182973 A1* 7/2010 Kim ...................... H04L 1/0015
370/329
2012/0122513 A1* 5/2012 Yang .................... H04L 5/0035
455/522
(Continued)

FOREIGN PATENT DOCUMENTS

| CN | 102123437 A | 7/2011 | |
|---|---|---|---|
| CN | 201210447339 | * 11/2012 | ............ H04W 52/18 |
| WO | WO 2012/098520 A2 | 7/2012 | |

OTHER PUBLICATIONS

3GPP TS 36.321 v 11.30 (Jun. 2013); Release 11, 3rd Generation Partnership Project; Technical Specification Group Radio Access Network; Evolved Universal Terrestrial Radio Access (E-UTRA); Medium Access Control (MAC) protocol specification.
(Continued)

*Primary Examiner* — Ankur Jain
(74) *Attorney, Agent, or Firm* — Birch, Stewart, Kolasch & Birch, LLP (57) ABSTRACT

The present disclosure provides a method for controlling uplink power, comprising: determining, by a Main eNodeB (MeNB), configured maximum transmit power P_MeNB of a User Equipment (UE) in a Primary Cell (PCell) and configured maximum transmit power P_SeNB of the UE in a Secondary Cell (SCell); notifying, by the MeNB, P_SeNB to a Secondary eNodeB (SeNB) corresponding to the SCell; and notifying P_MeNB and P_SeNB to the UE. The present disclosure further provides corresponding base station and UE.

16 Claims, 8 Drawing Sheets

(51) Int. Cl.
*H04W 52/34* (2009.01)
*H04W 72/04* (2009.01)
*H04W 52/36* (2009.01)

(52) U.S. Cl.
CPC ....... *H04W 52/346* (2013.01); *H04W 52/365* (2013.01); *H04W 52/367* (2013.01); *H04W 72/0473* (2013.01)

(58) Field of Classification Search
USPC .......................................................... 455/522
See application file for complete search history.

(56) References Cited

U.S. PATENT DOCUMENTS

| | | | |
|---|---|---|---|
| 2013/0336228 A1 | 12/2013 | Zhao et al. | |
| 2014/0135055 A1* | 5/2014 | Fu ....................... | H04W 52/146 455/522 |
| 2014/0185467 A1* | 7/2014 | Heo ...................... | H04W 52/54 370/252 |
| 2014/0355562 A1* | 12/2014 | Gao ......................... | H04B 7/02 370/331 |

OTHER PUBLICATIONS

3GPP TR 36.839 v 11.1.0 (Dec. 2012); Release 11, 3rd Generation Partnership Project; Technical Specification Group Radio Access Network; Evolved Universal Terrestrial Radio Access (E-UTRA) Mobility enhancements in heterogeneous networks.

3GPP TR 36.932 v 12.1.0 (Mar. 2013); Release 12, 3rd Generation Partnership Project; Technical Specification Group Radio Access Network; Scenarios and requirements for small cell enhancements for E-UTRA and E-UTRAN.

3GPP TS 36.300 v 10.12.0 (Dec. 2014); Release 10, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2.

3GPP TS 36.300 v 11.14.0 (Dec. 2015); Release 11, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2.

3GPP TS 36.300 v 12.8.0 (Dec. 2015); Release 12, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description Stage 2.

3GPP TS 36.413 v 11.4.0 (Jun. 2013); Release 11, 3rd Generation Partnership Project; Technical Specification Group Radio Access Network; Evolved Universal Terrestrial Radio Access (E-UTRAN); S1 application protocol (S1AP).

3GPP TS 36.423 v 11.5.0 (Jun. 2013); Release 11, 3rd Generation Partnership Project; Technical Specification Group Radio Access Network; Evolved Universal Terrestrial Radio Access (E-UTRAN); X2 application protocol (X2AP).

Interdigital, "P cMAXc and P cMAX for CA", TSG-RAN Working Group 4 (Radio) Meeting #58, R4-110650, Taipei, Taiwan, Feb. 21-25, 2011, 8 pages.

* cited by examiner

METHOD FOR CONTROLLING UPLINK POWER, ENODEB, AND USER EQUIPMENT

TECHNICAL FIELD

The present disclosure relates to the field of wireless communication technology, and more particularly, to a method for controlling uplink power, an eNodeB (eNB) and a User Equipment (UE).

BACKGROUND

In recent years, rapid development of wireless communication technology has promoted the progress of the society, and has profoundly influenced and changed people's ways of production and life. Meanwhile, people's requirements for better mobile communication services have prompted the rapid development of wireless communication technology. The fourth generation (4G) mobile communication system is born and developed in the background. In order to achieve the performance required for the 4G mobile communication system, 3GPP has introduced many new technologies in the Long Term Evolution (LTE)-Advanced system evolution technology as one of the IMT-Advanced system technical standards, such as Relay technology, Carrier Aggregation (CA) technology, Coordinated Multiple Points (CoMP) transmission technology and so on. For the purpose of enhancing hotspot coverage, reducing dead zones of a network, improving the performance of user services at the edge of a network, and increasing the system capacity of the network, micro cells are introduced.

In a heterogeneous network, a Main eNodeB (MeNB) and a Secondary eNodeB (SeNB) have different transmit power, and path losses from a user to the two eNBs are also different. Therefore, in consideration of the performance of uplink and downlink throughput for the user, optimal access cells of the user are different. In the LTE, as the user may implement cell selection or cell reselection according to Reference Signal Received Power (RSRP), the user may access a cell with the strongest received signal. This means that the user cannot access the optimal cells in the uplink and downlink at the same time. In this case, the optimal solution should be that the user accesses the optimal cells in the uplink and downlink respectively.

In the 3GPP TR 36.839, switching performance of a user is worse in the heterogeneous network than in a pure macro cell network, especially when a micro cell and a macro cell are deployed in the same frequency. In order to avoid such problem and ensure robustness of user mobility while enhancing load balancing, a solution is that the micro cell and the macro cell provide RRC signaling related to switching at the same time.

It has been mentioned in the 3GPP TR 36.839 that a switching frequency is much higher in a micro cell scenario than in a macro cell scenario, and when cell switching is performed at a high frequency, it will increase signaling overhead of the access network and the core network. In the current LTE architecture, a control plane bearer and a user plane bearer of a user end at the same eNB. When the user performs switching from a micro cell to another micro cell, it needs to change the control plane bearer and the user plane bearer of the user. In order to solve such problem, the user may access multiple eNBs at the same time, for example, the control plane bearer of the user is connected to the MeNB all the time, and the user plane bearer may be connected to the micro cell.

In the Release-10 and the Release-11, the carrier aggregation may largely enhance a peak rate of a user. However, due to the limitation by the delay, the carrier aggregation can only be completed within the same eNB. Therefore, in the heterogeneous network, carrier aggregation across eNBs cannot be used currently, which means the peak rate of the user is lower in the heterogeneous network than in the carrier aggregation scenario. In this case, if the user can access multiple eNBs at the same time, a higher peak rate can be acquired and cell load can be optimized.

A potential solution is to access the macro cell and the micro cell at the same time. The technical solution of a user accessing the macro cell and the micro cell at the same time is referred to as dual connectivity in the Release-12. The dual connectivity may be defined to be that a user may access multiple eNBs in the same frequency or different frequencies at the same time. In the 3GPP TR 36.932, a working scenario may be that there is an ideal or non-ideal backhaul link between the eNBs. For a scenario that there is an ideal backhaul link between the eNBs, related technologies such as CA, CoMP or the like in the Release-10/11 may be used. Therefore, in the Release-12, a working scenario of a non-ideal backhaul link is primarily concerned.

Control of uplink power of a transmitter plays a very important role in the mobile communication system, and is used to achieve a balance between two requirements below. One requirement is to achieve sufficient transmitted energy per bit required for Quality of Service (QoS), and the other requirement is to minimize the interference to other users of the system and maximize the battery life of the mobile terminal. In order to achieve this purpose, the control of the uplink power must adapt to the characteristics of the wireless propagation channel, including a path loss, a shadow effect, and fast fading, and overcome the interference from other users of the same cell and adjacent cells.

A process of controlling uplink power in the LTE is primarily as follows.

(1) A UE receives a Transmit Power Control (TPC) command.

(2) The UE measures pilot received power of a downlink wireless channel and calculates a path loss. The UE calculates transmit power P based on parameters such as the path loss, a bandwidth of an uplink shared channel, a transport format and the TPC or the like. If the UE triggers a Power Headroom Report (PHR) and a transmission condition is satisfied, the UE further needs to transmit the PHR on the uplink shared channel.

(3) After receiving the PHR on the physical uplink shared channel, the eNB transmits the TPC to the UE through a Physical Downlink Control CHannel (PDCCH) in a format of DCI Format 0/1/1A/1B/1D/2/2A/2B/2C/2D/3/3N4.

(4) Return to step (1), i.e., the UE receives a TPC command.

In steps (2) and (3) described above, the PHR transmitted by the UE to the eNB, as resource budget information of a Physical Uplink Shared CHannel (PUSCH), provides the eNB with a basis for allocating uplink resources. If the PHR reflects that the UE has large power headroom, the eNB may allocate more wireless resources to the UE; and if the PHR reflects that the UE has no or a few power headroom, the eNB can only allocate a few wireless resource blocks or a low-order modulation order to the UE. The PHR needs to be transmitted in two steps, i.e., triggering and then reporting. The UE triggers report of the PHR when a related timer expires, or a change in the path loss is large, or the PHR is configured/reconfigured, or the cell is activated or deactivated, and the UE reports the PHR to the eNB after acquiring enough PUSCH resources. The PHR, as a Media Access Control Control Element (MAC CE), is multiplexed in a MAC Protocol Data Unit (PDU), and is transmitted through the PUSCH.

$P_{CMAX}$ is configured maximum transmit power of the UE. A value range of $P_{CMAX}$ is primarily limited by two factors, which is limitation by the control of the eNB, and useless out-band radiation of the UE. For example, in order to satisfy the requirements for Spectrum Emission Mask (SEM) and Adjacent Channel Leakage Ratio (ACLR) or the like, the UE reduces the maximum transmit power (also referred to as power back-off).

In conclusion, as the new technology of dual connectivity is introduced in the Release-12, the UE can access the macro cell and the micro cell at the same time. It should be illustrated that the macro cell and the micro cell discussed above should be construed as a macro eNB and a micro eNB, and therefore, a cell here should be construed as an eNB. As there is no ideal backhaul link between the eNBs, the UE needs to transmit an uplink signal (an (ACK/NACK, CSI information, a UL-SCH or the like) to the macro cell/eNB and the micro cell/eNB respectively. At the same time, as the macro cell/eNB and the micro cell/eNB independently schedule the UE respectively, this will results in a dual connectivity UE does not have enough uplink transmit power to support simultaneous uplink transmission to both the macro cell/eNB and the micro cell/eNB. Obviously, the mechanism of controlling uplink power in the current Release-10/11 cannot solve the current problem. In the present disclosure, the cells/eNBs accessed by the UE are divided into a Primary Cell (PCell)/eNB and a Secondary Cell (SCell)/eNB respectively below. Obviously, after the carrier aggregation technology is used, various eNBs comprise multiple cells for a user, and therefore, the MeNB and the SeNB may be referred to as a group of PCells and a group of SCells.

SUMMARY

With respect to the above problems, the present disclosure primarily aims to provide a solution of controlling uplink power of a user in a dual connectivity scenario. According to the present disclosure, configured maximum transmit power of a UE may be configured as configured minimum guaranteed transmit power P_MeNB in a PCell and configured minimum guaranteed transmit power P_SeNB in an SCell as well as remaining power (if any) according to different access cells and/or eNBs. The so-called configured minimum guaranteed transmit power in a PCell and configured minimum guaranteed transmit power in an SCell refer to minimum uplink transmit power allocated to the UE in respective cells. The minimum guaranteed transmit power may be configured by a network side, or may be decided by the UE side itself. If it is configured by the network side, an MeNB may notify an SeNB of these parameters through a backhaul link or the UE. If it is configured by the UE side, the UE may notify the MeNB and the SeNB through a newly designed PHR including these parameters. The minimum guaranteed transmit power needs to at least satisfy any of the following conditions: P_MeNB>=0, P_SeNB>=0 or P_MeNB+P_SeNB<=PCmax or (δ*P_MeNB+(1-δ)*P_SeNB)/PCmax<=100% or P_MeNB<=PCMAX,M or P_SeNB<=PCMAX,S.

In an aspect of the present disclosure, a method for controlling uplink power is provided, comprising: determining, by a Main eNodeB (MeNB), configured minimum guaranteed transmit power P_MeNB of a User Equipment (UE) in a Primary Cell (PCell) and configured minimum guaranteed transmit power P_SeNB of the UE in a Secondary Cell (SCell); notifying, by the MeNB, P_SeNB and/or P_MeNB to a Secondary eNodeB (SeNB) corresponding to the SCell; and notifying P_MeNB and/or P_SeNB to the UE.

In an embodiment, the MeNB notifies P_SeNB and/or P_MeNB to the SeNB corresponding to the SCell through a power reserve indication message.

In an embodiment, the MeNB notifies P_MeNB and/or P_SeNB to the UE through Radio Resource Control (RRC) signaling.

In an embodiment, the MeNB notifies P_MeNB to the UE through the RRC signaling, and the SeNB notifies P_SeNB to the UE through the RRC signaling.

In an embodiment, the method further comprises: receiving, respectively by the MeNB and the SeNB, a Power Headroom Report (PHR) transmitted by the UE, and calculating actual transmit power of the UE based on the PHR.

In another aspect of the present disclosure, a method for controlling uplink power is provided, comprising: determining, by a Main eNodeB (MeNB), configured minimum guaranteed transmit power P_MeNB of a User Equipment (UE) in a Primary Cell (PCell) and/or configured minimum guaranteed transmit power P_SeNB of the UE in a Secondary Cell (SCell); notifying, by the MeNB, P_MeNB and/or P_SeNB to the UE through Radio Resource Control (RRC) signaling; and notifying, by the UE, P_SeNB to a Secondary eNodeB (SeNB) corresponding to the SCell through an advanced Power Headroom Report (aPHR).

In an embodiment, notifying, by the UE, P_SeNB to an SeNB corresponding to the SCell through an aPHR comprises: determining whether a trigger condition for the aPHR is satisfied; and transmitting the aPHR if the trigger condition for the aPHR is satisfied.

In an embodiment, the trigger condition comprises at least one of: the UE activating a dual connectivity state; a power headroom report of a data channel of a carrier being triggered; RRC signaling transmitted by an eNodeB (eNB) being received; default configuration of the UE being reporting the advanced power headroom report; a periodic timer configured for triggering report of the power headroom report being expired; and a report prohibition timer configured for prohibiting transmission of the power headroom report being expired, and a variation in a measured path loss exceeding a threshold.

In an embodiment, the method further comprises: receiving, by the MeNB, a Power Headroom Report (PHR) transmitted by the UE, and calculating actual transmit power of the UE in the PCell based on the PHR; and receiving, by the SeNB, the aPHR transmitted by the UE, and calculating actual transmit power of the UE in the SCell based on the aPHR.

In another aspect of the present disclosure, a method for controlling uplink power is provided, comprising: determining, by a User Equipment (UE), configured minimum guaranteed transmit power P_MeNB of the UE in a Primary Cell (PCell) and configured minimum guaranteed transmit power P_SeNB of the UE in a Secondary Cell (SCell); and notifying, by the UE, P_MeNB and P_SeNB to a Main eNodeB (MeNB) and a Secondary eNodeB (SeNB) respectively through an advanced Power Headroom Report (aPHR).

In an embodiment, notifying, by the UE, P_MeNB and P_SeNB to the MeNB and the SeNB respectively through an aPHR comprises: determining whether a trigger condition for the aPHR and/or the PHR is satisfied; and transmitting the aPHR and/or the PHR if the trigger condition for the aPHR and/or the PHR is satisfied.

In an embodiment, the trigger condition comprises at least one of: the UE activating a dual connectivity state; a power headroom report of a data channel of a carrier being triggered; RRC signaling transmitted by an eNodeB (eNB) being received; default configuration of the UE being reporting the advanced power headroom report; a periodic timer configured for triggering report of the power headroom report being expired; and a report prohibition timer configured for prohibiting transmission of the power headroom report being expired, and a variation in a measured path loss exceeding a threshold.

In an embodiment, the method further comprises: receiving, by the MeNB and the SeNB, the aPHR transmitted by the UE, and calculating actual transmit power of the UE based on the aPHR.

In another aspect of the present disclosure, a method for controlling uplink power is provided, comprising: acquiring, by a User Equipment (UE), configured minimum guaranteed transmit power P_MeNB of the UE in a Primary Cell (PCell) and configured minimum guaranteed transmit power P_SeNB of the UE in a Secondary Cell (SCell); and implementing power scaling if a power scaling condition is satisfied.

In an embodiment, the power scaling condition comprises power for scheduling the UE by any eNB being larger than configured minimum guaranteed transmit power of the eNB, and total transmit power of the UE being larger than total configured maximum transmit power.

If the power scaling condition is satisfied, the UE preferentially implements power scaling for a resident cell in which the transmit power exceeds configured minimum guaranteed transmit power plus remaining power (P_MeNB+P_remaining (P_SeNB+P_remaining)). A manner of power scaling in each group of resident cells is described in the Release-10/11 standard specification.

In an embodiment, the power scaling condition comprises power for scheduling the UE by all eNBs being larger than configured minimum guaranteed transmit power of respective eNBs, and total transmit power of the UE being larger than total configured maximum transmit power. If the power scaling condition is satisfied, the UE implements power scaling for various groups of cells. A manner of power scaling in each group of resident cells is described in the Release-10/11 standard specification.

In another aspect of the present disclosure, a method for allocating uplink power is provided to allocate uplink power of a User Equipment (UE) in each access eNB, the method comprising: allocating power in a main access eNB or a secondary access eNB to achieve P_MeNB or P_SeNB. Specifically, when a user is scheduled, the power which is allocated firstly corresponding to various access eNBs achieves P_SeNB or P_MeNB respectively without following a power allocation priority principle, wherein the transmit power of the UE is a smaller one of transmit power required for currently scheduling the UE and the configured minimum guaranteed transmit power of the UE, and the transmit power required for currently scheduling the UE is decided by uplink allowance and a Transmit Power Control (TPC) command); and allocating remaining power.

In an embodiment, for allocation of remaining power, if the UE is firstly scheduled in any access eNB, the eNB may preferentially use the remaining power.

In another aspect of the present disclosure, a base station is provided, comprising: a determination unit configured to determine configured minimum guaranteed transmit power P_MeNB of a User Equipment (UE) in a Primary Cell (PCell) and configured minimum guaranteed transmit power P_SeNB of the UE in a Secondary Cell (SCell); and a transmission unit configured to transmit the determined P_MeNB and P_SeNB.

In an embodiment, the transmission unit is configured to notify P_SeNB to a Secondary eNodeB (SeNB) corresponding to the SCell, and notify P_MeNB and P_SeNB to the UE.

In an embodiment, the transmission unit is configured to notify P_SeNB to the SeNB corresponding to the SCell through a power reserve indication message, and notify P_MeNB and P_SeNB to the UE through Radio Resource Control (RRC) signaling.

In an embodiment, the base station further comprises: a reception unit configured to receive a Power Headroom Report (PHR) transmitted by the UE, and calculate actual transmit power of the UE based on the PHR.

In another aspect of the present disclosure, a User Equipment (UE) is provided, comprising: a determination unit configured to determine configured minimum guaranteed transmit power P_MeNB of the UE in a Primary Cell (PCell) and configured minimum guaranteed transmit power P_SeNB of the UE in a Secondary Cell (SCell); and a transmission unit configured to notify P_MeNB and P_SeNB to a Main eNodeB (MeNB) and a Secondary eNodeB (SeNB) respectively through an advanced Power Headroom Report (aPHR).

In an embodiment, the transmission unit is configured to: determine whether a trigger condition for the aPHR is satisfied; and transmit the aPHR if the trigger condition for the aPHR is satisfied.

In an embodiment, the trigger condition comprises at least one of: the UE activating a dual connectivity state; a power headroom report of a data channel of a carrier being triggered; RRC signaling transmitted by an eNodeB (eNB) being received; default configuration of the UE being reporting the advanced power headroom report; a periodic timer configured for triggering report of the power headroom report being expired; and a report prohibition timer configured for prohibiting transmission of the power headroom report being expired, and a variation in a measured path loss exceeding a threshold.

In another aspect of the present disclosure, a User Equipment (UE) is provided, comprising: an acquisition unit configured to acquire configured minimum guaranteed transmit power P_MeNB of the UE in a Primary Cell (PCell) and configured minimum guaranteed transmit power P_SeNB of the UE in a Secondary Cell (SCell); and a power scaling unit configured to implement power scaling if a power scaling condition is satisfied.

In an embodiment, the power scaling condition comprises power for scheduling the UE by any eNB being larger than configured minimum guaranteed transmit power of the eNB, and total transmit power of the UE being larger than total configured maximum transmit power.

In an embodiment, the power scaling condition comprises power for scheduling the UE by all eNBs being larger than configured minimum guaranteed transmit power of respective eNBs, and total transmit power of the UE being larger than total configured maximum transmit power.

With the present disclosure, the energy utilization in the wireless communication system (for example, the LTE-Advanced system) can be enhanced, and the spectrum efficiency can be improved.

BRIEF DESCRIPTION OF THE DRAWINGS

The above and other features of the present disclosure will become more obvious through the detailed description below taken by accompanying drawings, in which.

DETAILED DESCRIPTION

The method for controlling uplink power of a dual connectivity UE, the eNB, and the UE proposed in the present disclosure will be described in detail below in conjunction with accompanying drawings and specific embodiments. It should be noted that the present disclosure should not be limited to the specific embodiments described below. In addition, for the sake of brevity, detailed description of well-known technology which is not directly associated with the present disclosure is omitted, to avoid confusing the understanding of the present disclosure.

Several embodiments of the present disclosure will be described in detail below by using an LTE mobile communication system and the subsequent evolution versions thereof as example application scenarios. However, it should be pointed out that the present disclosure is not limited to the following embodiments, and is applicable to many other wireless communication systems, for example, a future 5G cellular communication system.

Firstly, definition of configured maximum transmit power of a UE in various cells/eNBs will be introduced. In the Release-12, when a UE resides in more than one cell/eNB (for example, two cells/eNBs), the UE is configured with configured maximum transmit power $P_{CMAX,c}$ on each component carrier, and is configured with configured maximum transmit power, denoted as $P_{CMAX,M}$ and $P_{CMAX,S}$ here, in various cells/eNBs in which the UE resides respectively through RRC signaling. Obviously, value ranges of the two parameters are from −29 dBm to 23 dBm. It needs to select a larger one of the parameters $P_{CMAX,M}$ and $P_{CMAX,S}$ as total configured maximum transmit power $P_{CMAX}$, i.e., $P_{CMAX}=\max(P_{CMAX,M}, P_{CMAX,S})$. Then, the UE divides the total configured maximum transmit power $P_{CMAX}$ into total configured maximum transmit power $P_{M,CMAX}$ of a cell of an MeNB and/or total configured maximum transmit power $P_{S,CMAX}$ of a cell of an SeNB according to different access cells. It should be illustrated here that uplink maximum transmit power in a group of cells to which each eNB which is accessed by a dual connectivity user mentioned above belongs is configured for the eNB, and it may be deduced according to the first and second power scaling examples (see [1] and [2]) which are mentioned below that in addition to the configured maximum transmit power, remaining transmit power may also be used by the user, i.e., actual transmit power may be larger than the configured maximum transmit power. Therefore, the configured maximum transmit power only represents a configured value, and does not represent that the actual transmit power of the user cannot exceed the configured maximum transmit power. Consequently, the noun "maximum transmit power $P_{X,CMAX}$" which is mentioned in the following content is changed to "minimum guaranteed transmit power P_XeNB", wherein X may be M or S. It needs to satisfy at least any of the following conditions:

$$P\_MeNB>=0, P\_SeNB>=0 \text{ and/or}$$

$$P_{M,CMAX}+P_{S,CMAX} \leq P_{CMAX} P\_MeNB+ \\ P\_SeNB<=P_{CMAX} \text{ and/or } (\delta*P\_MeNB+ \\ (1-\delta)*P\_SeNB/P_{CMAX}<=100\%$$

$$P_{M,CMAX}<P_{CMAX,M} \text{ and/or } P\_MeNB<=P_{CMAX,M}$$

$$P_{S,CMAX}\leq P_{CMAX,S} \text{ and/or } P\_SeNB<=P_{CMAX,S}$$

Therefore, value ranges of P_MeNB and P_SeNB may be from −40 dBm to 23 dBm, and a sum of the both should be less than the total configured maximum transmit power of the UE. δ is a proportionality coefficient, and a value thereof is a number larger than 0 and less than 1.

The method for allocating uplink power of a UE in each access eNB may be decided by the following method.

(1) In a main access eNB or a secondary access eNB, power is allocated for a user, which may achieve P_MeNB or P_SeNB. Specifically, when the user is scheduled, the power allocated firstly for the user corresponding to various access eNBs achieves P_SeNB or P_MeNB respectively. In this case, there is no need to follow the power allocation priority principle. Therefore, the transmit power of the user is a smaller one of the transmit power required for currently scheduling the user (the power is decided by uplink allowance or a TPC command) and the configured minimum guaranteed transmit power of the user.

(2) Remaining power is allocated.

For the allocation of the remaining power, if the user is firstly scheduled in any access eNB, the remaining power may be preferentially used.

Figure 1:
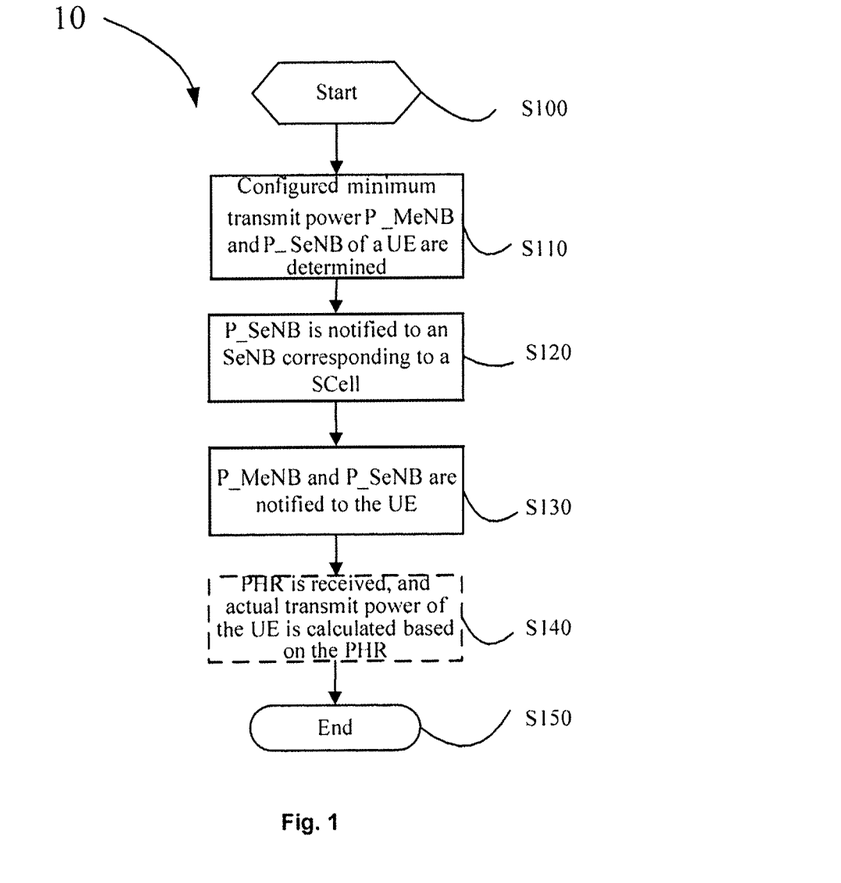
FIG. 1 is a flowchart illustrating a method for controlling uplink power according to an embodiment of the present disclosure.

FIG. 1 is a flowchart illustrating a method for controlling uplink power according to an embodiment of the present disclosure. In the present embodiment, configured minimum guaranteed transmit power of a UE in various cells is configured by an MeNB in an LTE network, and is notified to an SeNB through a backhaul link. As shown in FIG. 1, method 10 starts with step S100.

At step S110, the MeNB determines configured minimum guaranteed transmit power P_MeNB of the UE in a PCell and configured minimum guaranteed transmit power P_SeNB of the UE in an SCell.

At step S120, the MeNB notifies P_SeNB to an SeNB corresponding to the SCell. For example, the MeNB may notify a value of P_SeNB to the SeNB through an X2 interface.

When the UE is in a dual connectivity state, an X2-AP process is initiated. When the UE is not in the dual connectivity state, the eNB which is accessed by the UE normally schedules the UE as in the Release-10/11. The X2-AP process will be described in detail below.

Figure 4:
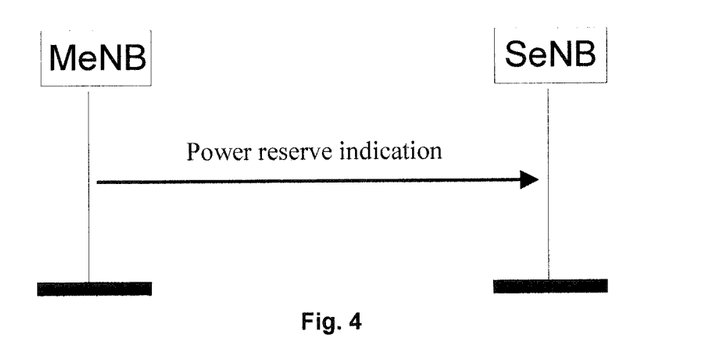
FIG. 4 is a flowchart illustrating an X2-AP process according to an embodiment of the present disclosure.

1. General

Firstly, the X2-AP function may be referred to as a power reserve indication message. As shown in FIG. 4, the power reserve indication message process is initiated by the MeNB, and the configured maximum transmit power of the related UE in the SeNB is notified to the SeNB through information included in the X2-AP. Signaling related to the UE may be used in this process.

2. Successful Operation

This process is initiated by the MeNB. The MeNB notifies the SeNB of the power reserve value of the UE by transmitting the power reserve message. After receiving the power reserve message, the SeNB schedules the related UE using a corresponding power reserve value.

3. Unsuccessful Operation

It is not applicable in the present disclosure.

4. Abnormal Conditions

If an abnormal condition occurs, the SeNB ignores this message.

A structure of the power reserve indication message included in the process and a power reserve Information Element (IE) included in the message may be designed as follows.

As the power reserve indication message is a new X2-AP, a new message type is added in the present disclosure. A modification to the message type in the TS 36.423 9.2.13 is shown in the following table. A new message type is added, and is defined as "16" power reserve indication.

TABLE 3

| | | Message type | | |
|---|---|---|---|---|
| IE/Group Name | Presence | Range | IE type and reference | Semantics description |
| Procedure code | Mandatory (M) | | INTEGER (0 . . . 255) | "0" = Handover Preparation . . . "16" = Power Reserve Indication |
| Type of Message | Mandatory (M) | | CHOICE (Initiating Message, Successful Outcome, Unsuccessful Outcome, . . .) | |

At step S130, the MeNB notifies P_MeNB and P_SeNB to the UE. The notification process may be implemented in many manners, which will be described below by way of examples.

In a first example, the MeNB notifies the configured minimum guaranteed transmit power P_MeNB and P_SeNB of the UE in different resident cells to the UE through RRC signaling. The two parameters are used for controlling uplink power, and may be included in for example IE UplinkPowerDedicated.

TABLE 1

| | | Power reserve indication message | | | | |
|---|---|---|---|---|---|---|
| IE/Group Name | Presence | Range | IE type and reference | Semantic description | Criticality | Assign criticality |
| Message Type | Mandatory (M) | | Table 3 | | Yes | Ignore |
| Old eNB UE X2AP Identity (ID) | Mandatory (M) | | See section TS 36.423 9.2.24 | Allocated at MeNB | Yes | Reject |
| New eNB UE X2AP ID | Mandatory (M) | | See section TS 36.423 9.2.24 | Allocated at SeNB | Yes | Reject |
| Power Reserve Value | Mandatory (M) | | Table 2 | | | |

Definitions of IDs (for example, Presence, Range, Criticality and Assigned Criticality) in the table may be known with reference to TS 36.413.

The power reserve value provides a power reserve value of the UE to a corresponding cell, i.e., a value of the configured minimum guaranteed transmit power P_SeNB of the dual connectivity UE in the SeNB for scheduling. The specific design of the information is for example illustrated in the following table.

TABLE 2

| | | Power reserve value | | | | |
|---|---|---|---|---|---|---|
| IE/Group Name | Presence | Range | IE type and reference | Semantic description | Criticality | Assign criticality |
| Power Reserve Value | Mandatory (M) | | (INTEGER (−40 . . . 23)) | Value range is from −40 dBm to 23 dBm, with a step in units of 1 dB | | |

```
--ASN1START
UplinkPowerControlDedicated-r12 ::=    SEQUENCE {
    P-MeNB              INTEGER (-40.. P__MeNB)     OPTIONAL,     -- Need OR
    P-SeNB              INTEGER (-40.. P__SeNB)     OPTIONAL,     -- Need OR
--ASN1STOP
```

P-MeNB and P-SeNB correspond to P_MeNB and P_SeNB, and a value range thereof is from −40 dBm to 23 dBm.

In a second example, the MeNB and the SeNB notify the configured minimum guaranteed transmit power P_MeNB and P_SeNB of the UE in different resident cells respectively to the UE through RRC signaling. The two parameters are used for controlling uplink power, and may be included in for example IE UplinkPowerDedicated.

```
--ASN1START
UplinkPowerControlDedicated-r12 ::=    SEQUENCE {
    P-XeNB              INTEGER (-40.. P__XeNB)     OPTIONAL,     -- Need OR
--ASN1STOP
```

P-XeNB corresponds to P_MeNB or P_SeNB, and a value range thereof is from −40 dBm to 23 dBm.

Alternatively, method 10 may comprise step S140. At S140, the MeNB receives a PHR transmitted by the UE, and calculates actual transmit power of the UE based on the PHR. For example, the MeNB and the SeNB receive a PHR transmitted by the UE. Then, the MeNB may calculate the actual transmit power of the UE in various resident cells. The MeNB or the SeNB substitutes $P_{CMAX}$ with P_MeNB or P_SeNB as the configured maximum transmit power in various resident cells. Thus, the eNB may accurately schedule the UE based on the actual transmit power in the resident cells and the configured minimum guaranteed transmit power.

Finally, method 10 ends at step S150.

Figure 2:
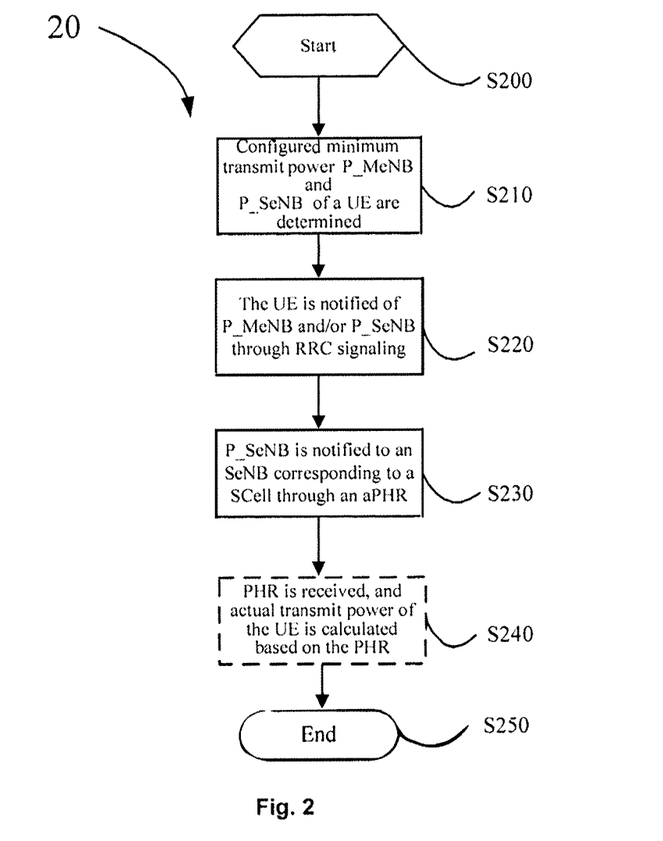
FIG. 2 is a flowchart illustrating a method for controlling uplink power according to another embodiment of the present disclosure.

FIG. 2 is a flowchart illustrating a method for controlling uplink power according to another embodiment of the present disclosure. In the present embodiment, configured minimum guaranteed transmit power of a UE in various resident cells is configured by an MeNB, and is notified to an SeNB by the UE. As shown in FIG. 2, method 20 starts with step S200.

At step S210, the MeNB determines configured minimum guaranteed transmit power P_MeNB of the UE in a PCell and configured minimum guaranteed transmit power P_SeNB of the UE in an SCell.

At step S220, the MeNB notifies P_MeNB and P_SeNB to the UE through RRC signaling. For example, the MeNB may notify the configured minimum guaranteed transmit power P_MeNB and P_SeNB of the UE in different resident cells to the UE through the RRC signaling. In this case, the RRC signaling is the same as that in the first example of configuration of RRC signaling described above. The two parameters are used for controlling uplink power, and may be included in IE UplinkPowerDedicated.

P-M-cmax and P-S-cmax correspond to P_MeNB and P_SeNB, and a value range thereof is from −40 dBm to 23 dBm.

Method 20 comprises step S230. At S230, P_SeNB is notified by the UE to the SeNB corresponding to the SCell through an aPHR. A process of transmitting the aPHR will be described in detail below with reference to FIG. 3.

Figure 3:
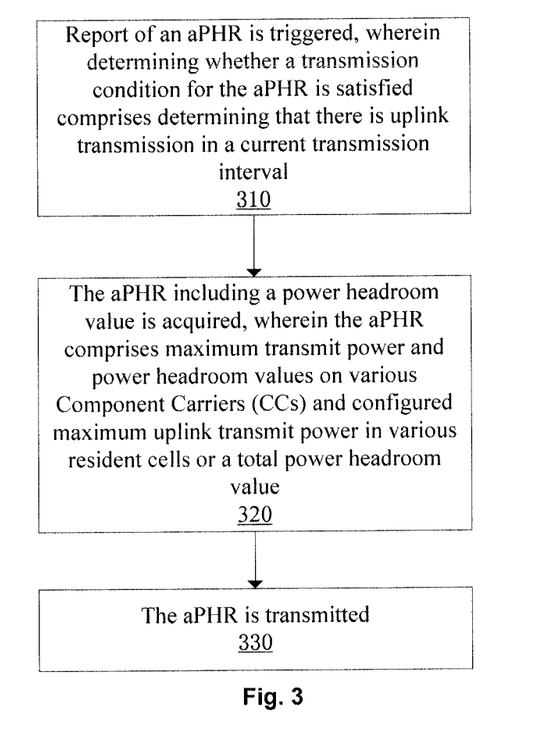
FIG. 3 is a flowchart illustrating a method for transmitting an advanced power headroom report according to an embodiment of the present disclosure.

Trigger Conditions:

When a Release-12 user starts to enter a dual connectivity state, i.e., switching from single connectivity to dual connectivity, it is referred to as activating a dual connectivity state. Obviously, the configured minimum guaranteed transmit power corresponding to the UE is configured by the MeNB, and an advanced power headroom report of the UE is triggered (310). When the user is in a dual connectivity state, if it is determined that a trigger condition for a PHR in the Release-10/11 is satisfied, the aPHR is triggered and transmitted (320). The trigger condition comprises at least one of: a power headroom report of a data channel of a carrier being triggered; RRC signaling transmitted by an eNB being received; default configuration of the UE being reporting the advanced power headroom report; a periodic timer configured for triggering report of the power headroom report being expired; a report prohibition timer configured for prohibiting transmission of the power headroom report during timing being expired, and a variation in a measured path loss exceeding a threshold; the UE having executed more than one configured TPC command; and the UE being configured with a new Scell.

Figure 5A:
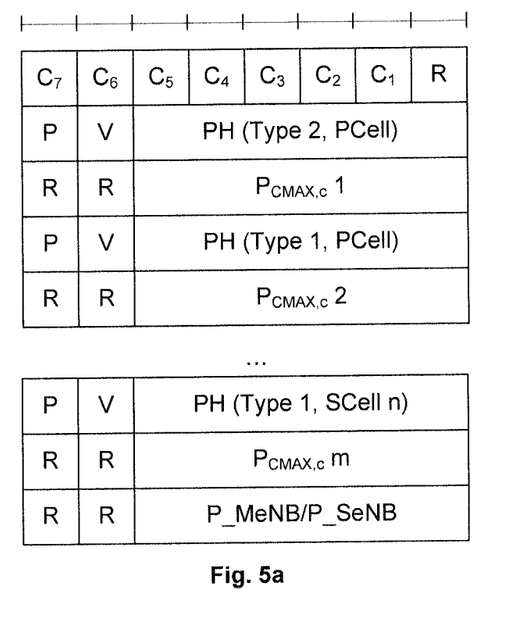
FIG. 5a is a structural diagram illustrating an MAC CE of an advanced power headroom report according to an embodiment of the present disclosure.

At 330, in a current working mode, an aPHR transmitted by the UE, as shown in FIG. 5a, is used to substitute the PHR in the Release-10/11. A last bit of a first byte is set to "1", which may be referred to as indication information indicating that the power headroom report comprises the configured minimum guaranteed transmit power P_SeNB of the UE in the SeNB, or a ratio δ of the configured minimum guaranteed transmit power, or the total power headroom in the cell. The configured minimum guaranteed transmit power P_SeNB is encapsulated in n bits included in the power headroom report in a predetermined order. A representation manner of P_SeNB in the aPHR may be as follows.

In a first example, with reference to the manner of mapping $P_{CMAX,c}$ in the PHR, P_XeNB may be mapped according to the following table.

```
--ASN1START
UplinkPowerControlDedicated-r12 ::=    SEQUENCE {
    P-MeNB              INTEGER (-40.. P__MeNB)     OPTIONAL,     -- Need OR
    P-SeNB              INTEGER (-40.. P__SeNB)     OPTIONAL,     -- Need OR
--ASN1STOP
```

TABLE 4

Mapping of $P_{cMAX}$

| Reported value | Measured quantity value | Unit |
|---|---|---|
| Configured maximum transmit power_00 (PXeNB_00) | P_XeNB < −39 | dBm |
| Configured maximum transmit power_01 (PXeNB_01) | −39 <= P_XeNB < 38 | dBm |
| ... | ... | ... |
| Configured maximum transmit power_62 (PXeNB_62) | 22 <= P_XeNB < 23 | dBm |
| Configured maximum transmit power_63 (PXeNB_63) | 23 <= P_XeNB | dBm |

X may be M or S, which refers to a macro eNB or an SeNB. The UE is notified of a value of P_SeNB through RRC signaling from the MeNB.

Figure 5B:
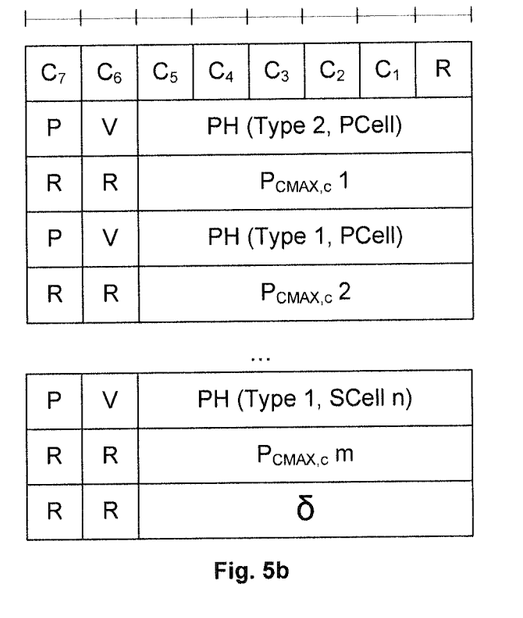
FIG. 5b is a structural diagram illustrating an MAC CE of another advanced power headroom report according to an embodiment of the present disclosure.

In a second example, as shown in FIG. 5b, as backward compatibility is taken into consideration, there is total configured maximum transmit power $P_{CMAX}$ of the UE. For this reason, a parameter δ is design as a proportionality coefficient, so that $P\_XeNB = δ*P_{CMAX}$, wherein X may be M or S. The parameter δ is comprised of y bits, wherein y is a natural number.

Specifically, in an example, a value of the parameter δ may be in a range of {0, 0.4, 0.5, 0.6, 0.7, 0.8, 0.9, 1}, and in this case, the parameter δ comprises 3 bits. In another example, the parameter δ may be in a form of percentage, i.e., INTEGER(1 . . . 100), wherein 1 represents a minimum percentage and 100 represents a maximum percentage. In this case, the parameter δ comprises 7 bits. Detailed description of various parameters in the figure may be known with reference to TS 36.321 6.1.3.6a.

Figure 5C:
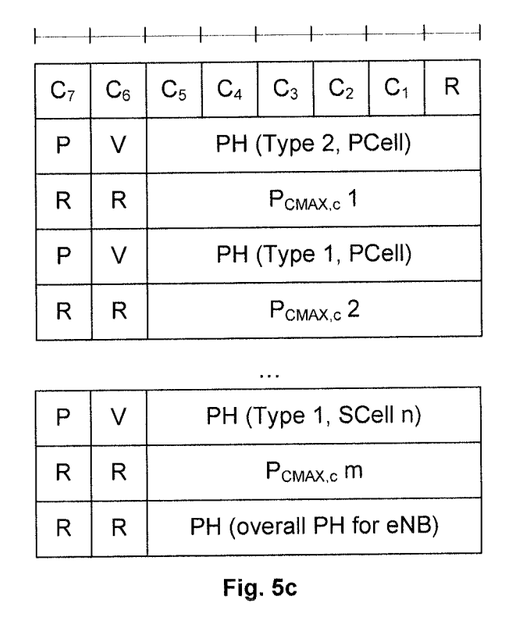
FIG. 5c is a structural diagram illustrating an MAC CE of a further advanced power headroom report according to an embodiment of the present disclosure.

In a third example, as shown in FIG. 5c, the UE has known the configured minimum guaranteed transmit power thereof in a cell of the SeNB, and at the same time, the UE has known actual transmit power thereof in the cell of the SeNB. Therefore, the total power headroom on various component carriers of the cell of the SeNB may be calculated at the UE. Compared with the above embodiment, the total power headroom is added in the power headroom report here to form an aPHR. Obviously, the manner of mapping the total power headroom value is the same as the manner of mapping the power headroom.

Alternatively, method 20 may comprise step S240. At S240, the MeNB receives the PHR transmitted by the UE, and calculates the actual transmit power of the UE in the PCell based on the PHR; and the SeNB receives the aPHR transmitted by the UE, and calculates the actual transmit power of the UE in the SCell based on aPHR. The MeNB substitutes $P_{CMAX}$ with P_MeNB as the configured minimum guaranteed transmit power in the resident cell. In this way, the MeNB accurately schedules the UE through the actual transmit power and the configured minimum guaranteed transmit power in the resident cell. Similarly, the SeNB substitutes $P_{CMAX}$ with P_SeNB as the configured minimum guaranteed transmit power in the resident cell. In this way, the SeNB accurately schedules the UE through the actual transmit power and the configured minimum guaranteed transmit power in the resident cell.

Finally, method 20 ends at step S250.

Figure 6:
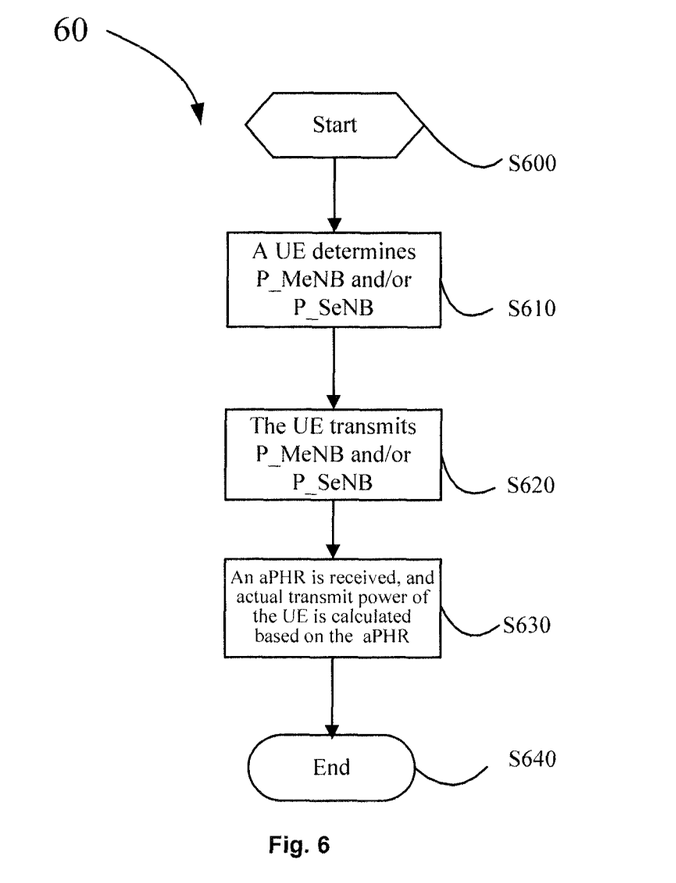
FIG. 6 is a flowchart illustrating a method for controlling uplink power according to another embodiment of the present disclosure.

FIG. 6 is a flowchart illustrating a method for controlling uplink power according to another embodiment of the present disclosure. In the present embodiment, a UE determines configured maximum transmit power P_MeNB and P_SeNB, and notifies an MeNB and an SeNB through an aPHR. As shown in FIG. 6, method 60 starts with step S600.

In order to take backward compatibility into consideration, the MeNB and the SeNB configure configured maximum transmit power of the UE in a PCell and an SCell, denoted as $P_{CMAX,M}$ and $P_{CMAX,S}$ here, respectively through RRC signaling as in the Release-10/11. Obviously, value ranges of the two parameters are from −29 dBm to 23 dBm. A larger one of $P_{CMAX,M}$ and $P_{CMAX,S}$ is selected as total configured maximum transmit power $P_{CMAX}$, i.e., $P_{CMAX} = \max(P_{CMAX,M}, P_{CMAX,S})$.

At step S610, the UE determines configured minimum guaranteed transmit power thereof P_MeNB in the PCell and/or configured minimum guaranteed transmit power thereof P_SeNB in the SCell. It needs to satisfy at least any of the following conditions:

$P\_MeNB >= 0, P\_SeNB >= 0$ $P\_MeNB + P\_SeNB <= P_{Cmax}$ or $(δ*P\_MeNB + (1−δ)*P\_SeNB)/P_{Cmax} <= 100\%$ $P\_MeNB <= P_{CMAX,M}$ $P\_SeNB <= P_{CMAX,S}$ At step S620, the UE notifies P_MeNB and P_SeNB to the MeNB and the SeNB respectively through an aPHR. The process of transmitting the aPHR has been described in detail above with reference to FIG. 3, and will not be repeated here.

At step S630, the MeNB and the SeNB receive the aPHR transmitted by the UE, and calculate actual transmit power of the UE based on the aPHR. Various eNBs substitute $P_{CMAX}$ with P_MeNB or P_SeNB as the configured maximum transmit power in the resident cell. In this way, various eNBs may accurately schedule the UE through the actual transmit power and the configured maximum transmit power in the resident cell.

Finally, method 60 ends at step S640.

Figure 7:
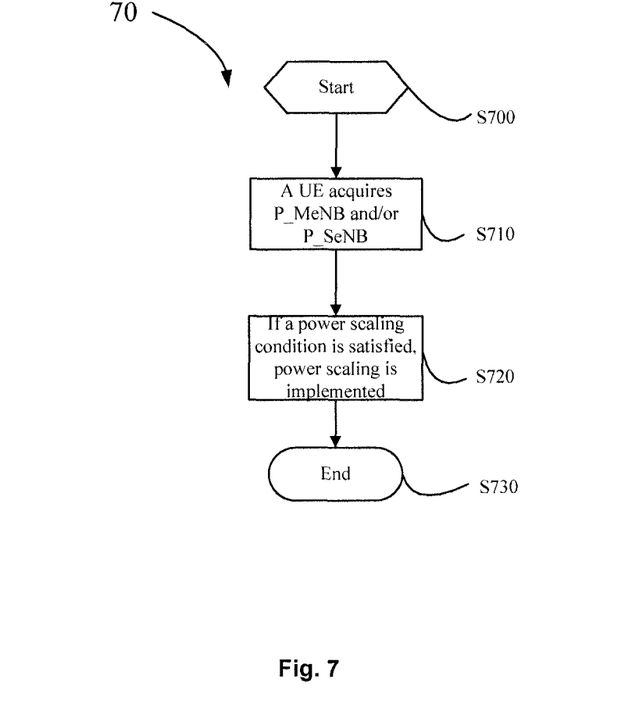
FIG. 7 is a flowchart illustrating a method for controlling uplink power according to another embodiment of the present disclosure.

FIG. 7 is a flowchart illustrating a method for controlling uplink power according to another embodiment of the present disclosure. As shown in FIG. 7, method 70 starts with step S700.

At step S710, a UE acquires configured minimum guaranteed transmit power thereof P_MeNB in a PCell and configured minimum guaranteed transmit power thereof P_SeNB in an SCell.

At step S720, it is determined whether a power scaling condition is satisfied. If so, power scaling is implemented. For example, the power scaling condition may comprise power for scheduling the UE by any eNB being larger than configured minimum guaranteed transmit power of the UE in the eNB, and total transmit power of the UE being larger than total configured maximum transmit power of the UE. Alternatively, the power scaling condition may comprise power for scheduling the UE by all eNBs being larger than configured minimum guaranteed transmit power of the UE in respective eNBs, and total transmit power of the UE being larger than total configured maximum transmit power of the UE.

For example, the UE may acquire configured minimum guaranteed transmit power thereof P_MeNB and P_SeNB in various resident cells through RRC signaling. Alternatively, the UE may determine configured minimum guaranteed transmit power thereof P_MeNB and P_SeNB in various resident cells by itself. Then, the UE may operate in a manner in the Release-10/11 standard specification. In this case, the UE substitutes $P_{CMAX}$ with P_MeNB and P_SeNB as the configured maximum transmit power thereof in the resident cell, and uses it as a basis for power scaling, which will be described by means of examples below.

In a first example, when power for scheduling the UE by any eNB is larger than the configured minimum guaranteed transmit power of the eNB, and the total transmit power of the UE is less than the total configured maximum transmit power, i.e., $P_{M,PUCCH}+P_{M,PUSCH}>P_{M,CMAX}$ or $P_{S,PUCCH}+P_{S,PUSCH}>P_{S,CMAX}$, while $P_{PUCCH}+P_{PUSCH}\leq P_{CMAX}$, it needs not to implement power scaling.

In a second example, when power for scheduling the UE by any eNB is larger than the configured minimum guaranteed transmit power of the eNB, and the total transmit power of the UE is larger than the total configured maximum transmit power, i.e., $P_{M,PUCCH}+P_{M,PUSCH}>P_{M,CMAX}$ or $P_{S,PUCCH}+P_{S,PUSCH}>P_{S,CMAX}$, while $P_{PUCCH}+P_{PUSCH}>P_{CMAX}$, it needs to implement power scaling. Specifically, the UE preferentially implements power scaling for a resident cell in which the transmit power exceeds configured minimum guaranteed transmit power plus remaining power (P_MeNB+P_remaining (P_SeNB+P_remaining)). A manner of power scaling is described in the Release-10/11 standard specification.

In a third example, when power for scheduling the UE by all eNBs is larger than the configured maximum transmit power of respective eNBs, and the total transmit power of the UE is larger than the total configured maximum transmit power, i.e., $P_{M,PUCCH}+P_{M,PUSCH}>P_{M,CMAX}$ and $P_{S,PUCCH}+P_{S,PUSCH}>P_{S,CMAX}$, while $P_{PUCCH}+P_{PUSCH}>P_{CMAX}$, it needs to implement power scaling. Specifically, the UE implements power scaling on transmit power in various resident cells at the same time. The power scaling may be implemented in accordance with the Release-10/11 standard specification.

Finally, method 70 ends at step S730.

Figure 8:
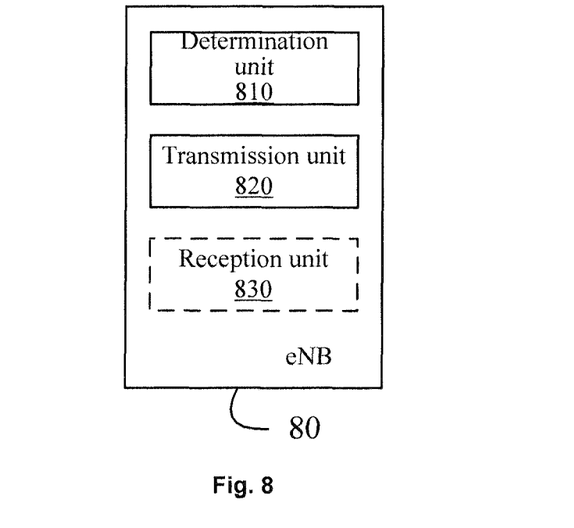
FIG. 8 is a block diagram illustrating an eNB according to another embodiment of the present disclosure.

FIG. 8 is a block diagram illustrating a base station according to another embodiment of the present disclosure. As shown in FIG. 8, the base station 80 comprises a determination unit 810 and a transmission unit 820. Alternatively, the base station 80 further comprises a reception unit 830. The base station 80 illustrated in FIG. 8 may be used to implement the methods illustrated in FIGS. 1-2.

The determination unit 810 is configured to determine configured minimum guaranteed transmit power P_MeNB of a UE in a PCell and configured minimum guaranteed transmit power P_SeNB of the UE in an SCell.

The transmission unit 820 is configured to transmit the determined P_MeNB and P_SeNB. For example, the transmission unit 820 may notify P_SeNB to an SeNB corresponding to the SCell, and notify P_MeNB and P_SeNB to the UE. Preferably, the transmission unit 820 notifies P_SeNB to the SeNB corresponding to the SCell through a power reserve indication message, and notifies P_MeNB and P_SeNB to the UE through RRC signaling.

The reception unit 830 is configured to receive a PHR and/or an aPHR transmitted by the UE, and calculate actual transmit power and remaining schedulable power of the UE based on the PHR and/or the aPHR.

Figure 9:
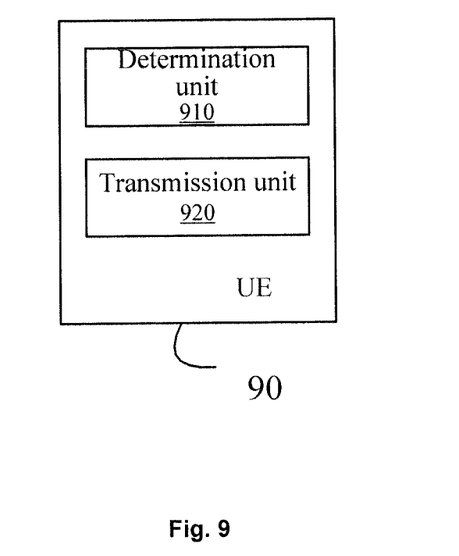
FIG. 9 is a block diagram illustrating a UE according to another embodiment of the present disclosure.

FIG. 9 is a block diagram illustrating a UE 90 according to another embodiment of the present disclosure. As shown in FIG. 9, the UE 90 comprises a determination unit 910 and a transmission unit 920. The UE 90 illustrated in FIG. 9 may be used to implement the method illustrated in FIG. 6.

The determination unit 910 is configured to determine configured minimum guaranteed transmit power P_MeNB of the UE in a PCell and configured minimum guaranteed transmit power P_SeNB of the UE in an SCell.

The transmission unit 920 is configured to notify P_MeNB and P_SeNB to an MeNB and an SeNB respectively through an aPHR. Preferably, the transmission unit 920 firstly determines whether a trigger condition for the aPHR and/or the PHR is satisfied, and transmits the aPHR and/or the PHR if the trigger condition for the aPHR and/or the PHR is satisfied. The trigger condition may comprise at least one of: the UE activating a dual connectivity state; a power headroom report of a data channel of a carrier being triggered; RRC signaling transmitted by an eNB being received; default configuration of the UE being reporting the advanced power headroom report; a periodic timer configured for triggering report of the power headroom report being expired; and a report prohibition timer configured for prohibiting transmission of the power headroom report being expired, and a variation in a measured path loss exceeding a threshold.

Figure 10:
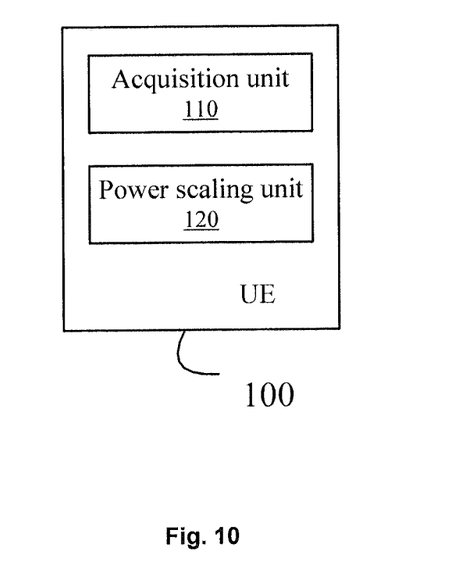
FIG. 10 is a block diagram illustrating a UE according to another embodiment of the present disclosure.

FIG. 10 is a block diagram illustrating a UE 100 according to another embodiment of the present disclosure. As shown in FIG. 10, the UE 100 comprises an acquisition unit 110 and a power scaling unit 120. The UE 100 illustrated in FIG. 10 may be used to implement the method illustrated in FIG. 7.

The acquisition unit 110 is configured to acquire configured minimum guaranteed transmit power P_MeNB of the UE in a PCell and configured minimum guaranteed transmit power P_SeNB of the UE in an SCell.

The power scaling unit 120 is configured to implement power scaling if a power scaling condition is satisfied. For example, the power scaling condition may comprise power for scheduling the UE by any eNB being larger than configured minimum guaranteed transmit power of the eNB, and total transmit power of the UE being larger than total configured maximum transmit power. Alternatively, the power scaling condition comprises power for scheduling the UE by all eNBs being larger than configured minimum guaranteed transmit power of respective eNBs, and total transmit power of the UE being larger than total configured maximum transmit power.

The present disclosure has proposed several methods for controlling uplink power for a dual connectivity UE. With the technical solutions according to the present disclosure, the utilization of uplink resources by an LTE supported dual connectivity UE can be enhanced, and the spectrum/energy efficiency can be improved.

It can be appreciated that the above embodiments of the present disclosure can be implemented in software, hardware or a combination thereof. For example, the internal components in the eNB and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) or the like.

In the present disclosure, the term "eNB" means a mobile communication data and control exchange center with a large transmit power and a wide coverage area and including functions such as resource allocation/scheduling, data reception/transmission or the like. The term "UE" means a user mobile terminal, including e.g., a mobile phone, a notebook computer and other terminal devices that can wirelessly communicate with an eNB or an MeNB.

Further, the embodiments of the present disclosure can be implemented in computer program products. More specifically, a computer program product can be a product having a computer readable medium with computer program logics coded thereon. When executed on a computing device, the computer program logics provide related operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the technical solutions according to the embodiments of the present disclosure.

The present disclosure has been described above with reference to the preferred embodiments thereof. It should be understood by those skilled in the art that various modifications, alternations and changes can be made without departing from the spirits and scope of the present disclosure. Therefore, the scope of the present disclosure is not limited to the above particular embodiments but only defined by the claims as attached and the equivalents thereof.

What is claimed is:

1. A master eNB (MeNB) comprising:
transmission circuitry configured to and/or programmed to transmit first information indicating a guaranteed power for the MeNB and second information indicating a guaranteed power for a secondary eNB (SeNB) to a user equipment (UE) via Radio Resource Control (RRC) signaling, the guaranteed power being a minimum power that is guaranteed as an allocation to each cell group of the MENB and the SeNB, and
reception circuitry configured to and/or programmed to receive a uplink transmission on the basis of a transmit power from the UE;
wherein the transmit power is given by at least one of the first information and the second information which are indicated from the MeNB to the SeNB through an X2 interface.

2. The MeNB according to claim 1, wherein
the at least one of the guaranteed power for the MeNB and the guaranteed power for the SeNB is configured with use of a ratio value of a maximum UE output power $P_{CMAX}$.

3. The MeNB according to claim 1, wherein the SeNB is a eNB other than the MeNB.

4. The MeNB according to claim 1, wherein a value indicated by the at least one of the first information and the second information is 0 or more.

5. The MeNB according to claim 1, wherein the first information and the second information are independently configured by the RRC signaling.

6. The MeNB according to claim 1, wherein the at least one of the first information and the second information is used by the UE for power scaling of the transmit power.

7. The MeNB according to claim 1, wherein the at least one of the guaranteed power for the MeNB and the guaranteed power for the SeNB is obtained by multiplying the maximum UE output power PCMAX by the ratio value, the ratio being a value between 0 and 1.

8. A user equipment (UE) comprising:
reception circuitry configured to and/or programmed to receive first information indicating a guaranteed power) for a master eNB (MeNB) and second information indicating a guaranteed power for a secondary eNB (SeNB) via Radio Resource Control (RRC) signaling from the MeNB, the guaranteed power being a minimum power that is guaranteed as an allocation to each cell group of the MENB and the SeNB, and
transmission circuitry configured to and/or programmed to transmit a uplink transmission on the basis of a transmit power;
wherein the transmit power is given by at least one of the first information and the second information which are indicated from the MeNB to the SeNB through an X2 interface.

9. The UE according to claim 8, wherein
the at least one of the guaranteed power for the MeNB and the guaranteed power for the SeNB is configured with use of a ratio value of a maximum UE output power $P_{CMAX}$.

10. The UE according to claim 8, wherein the SeNB is a eNB other than the MeNB.

11. The UE according to claim 8, wherein a value indicated by the at least one of the first information and the second information is 0 or more.

12. The UE according to claim 8, wherein the first information and the second information are independently configured by the RRC signaling.

13. The UE according to claim 8, wherein the at least one of the first information and the second information is used by the UE for power scaling of the transmit power.

14. The UE according to claim 8, wherein the at least one of the guaranteed power for the MeNB and the guaranteed power for the SeNB is obtained by multiplying the maximum UE output power PCMAX by the ratio value, the ratio value being a value between 0 and 1.

15. A controlling method for a master eNB (MeNB), the method comprising:
transmitting first information indicating a guaranteed power for the MeNB and second information indicating a guaranteed power for a secondary eNB (SeNB) to a user equipment (UE) via a Radio Resource Control (RRC) signaling, the guaranteed power being a minimum power that is guaranteed as an allocation to each cell group of the MENB and the SeNB, and
receiving an uplink transmission on the basis of a transmit power from the UE;
wherein the transmit power is given by at least one of the first information and the second information which are indicated from the MeNB to the SeNB through an X2 interface.

16. A controlling method for a user equipment (UE), the method comprising:
receiving first information indicating a guaranteed power for a master eNB (MeNB) and second information indicating a guaranteed power for a secondary eNB (SeNB) via a Radio Resource Control (RRC) signaling from the MeNB, the guaranteed power being a minimum power that is guaranteed as an allocation to each cell group of the MENB and the SeNB, and
transmitting an uplink transmission on the basis of a transmit power;

wherein the transmit power is given by at least one of the first information and the second information which are indicated from the MeNB to the SeNB through an X2 interface.

* * * * *